US006944403B2

(12) United States Patent
Margalit et al.

(10) Patent No.: US 6,944,403 B2
(45) Date of Patent: Sep. 13, 2005

(54) MEMS BASED OVER-THE-AIR OPTICAL DATA TRANSMISSION SYSTEM

(76) Inventors: Shlomo Margalit, 20322 Gresham St., Winnetka, CA (US) 91311; Herzel Laor, 2050 Hillsdale Cir., Boulder, CO (US) 80305

(*) Notice: Subject to any disclaimer, the term of this patent is extended or adjusted under 35 U.S.C. 154(b) by 449 days.

(21) Appl. No.: 09/878,144

(22) Filed: Jun. 8, 2001

(65) Prior Publication Data

US 2002/0080455 A1 Jun. 27, 2002

Related U.S. Application Data

(60) Provisional application No. 60/210,613, filed on Jun. 9, 2000.

(51) Int. Cl.7 ................................ H04B 10/00
(52) U.S. Cl. ........................ 398/129; 398/118; 398/131
(58) Field of Search ........................ 398/16, 20, 22–25, 398/82–88, 114–118, 121–125, 169, 170, 201, 212, 79, 129, 96, 103; 385/16

(56) References Cited

U.S. PATENT DOCUMENTS 5,713,364 A * 2/1998 DeBaryshe et al. ......... 600/476
5,848,211 A * 12/1998 Yang et al. .................... 385/93
6,181,474 B1 * 1/2001 Ouderkirk et al. .......... 359/629
6,451,008 B1 * 9/2002 Frey et al. ..................... 606/10
6,507,424 B2 * 1/2003 Sakanaka .................... 398/129
6,577,421 B1 * 6/2003 Cheng et al. ............... 398/129

* cited by examiner

*Primary Examiner*—Jason Chan
*Assistant Examiner*—David C. Payne
(74) *Attorney, Agent, or Firm*—Nydegger & Associates

(57) ABSTRACT

Building-to-building over the air transmission of optical data is a growing area of data communications. The fast growing use of bandwidth mandates the use of over the air transmission equipment capable of similar performance as the performance of fiber optic transmission, for distances of 3–10 Km. Transparent transmission is important to enable seamless growth from low data-rare to Gbps rates, and then to Dense Wavelength Division Multiplexed (DWDM) transmission of several wavelengths. The only way to achieve the required performance is with narrow, directable beams. This patent application discloses a Micro-Electro-Mechanical-Systems (MEMS) mirror based, over the air, optical data transmission system. A narrow optical beam is used and a MEMS mirror fine-tunes the aiming of the beam to track building movement, vibrations etc.

11 Claims, 10 Drawing Sheets

MEMS BASED OVER-THE-AIR OPTICAL DATA TRANSMISSION SYSTEM

This non-provisional application takes priority from U.S. Provisional Application Ser. No. 60/210,613 filed on Jun. 9, 2000.

BACKGROUND OF THE INVENTION

A description of some technologies related to embodiments of the invention follows:

U.S. Pat. No. 4,662,004 Fredriksen, et al. Fredriksen describes an optical communication link that includes a separate laser (in addition to the data transmission laser), which returns information about the level of the received signal to the transmitter. This separate laser is adjusted to emit power proportional to the received beam power.

U.S. Pat. No. 4,832,402 Brooks. Brooks describes a fast scanning mirror used to time-multiplex light beam into several steering mirrors, in which each of the steering mirrors aim the beam into one or a group of targets clustered together. The steering mirrors are slow due to the large angle required. Brooks also describes the use of "beacon transmitters" to said in target tracking (column 9 line 15).

U.S. Pat. No. 5,282,073 Defour, et al. Detour shows optical communications system with two galvanometer mirrors for beam steering, and a complex wide-angle lens to increase the angular scanning to a half-sphere. Defour also describes a target designation step, an iterative step of bilateral acquisition and a third step of exchanging data.

U.S. Pat. No. 5,390,040 Mayeux. Mayeux describes the use of one steerable mirror at the expanded beam location for aiming both the transmit beam and receive beam. Part of the surface of the mirror is used for transmission, and another part is used for reception. (Mayeux calls these parts of the mirror "field of views", in contrast to common terminology.)

U.S. Pat. No. 5,448,391 Iriama, et at. Iriama describes the use of an optical Position Detector sensor (common art) to track the beam direction. A pair of mirrors is used for slow, large angle direction control and a fast lens is moved for fast corrections.

U.S. Pat. No. 5,646,761 Medved, et at. Medved describes an optical communications between a stationary location, like an airport gate, and a movable object, like an airplane parked at the gate. The optical units on the gate and the airplane are searching for each other, and stop this search when aligned.

U.S. Pat. No. 5,710,652 Bloom, et at. Bloom describes optical transmission equipment to interconnect low Earth orbit satellites. The whole transmitter and receiver unit is mounted on gimbals. Two lasers are used, one for tracking and one for data. A CCD optical detector detects a target location for tracking a servo control.

U.S. Pat. No. 5,768,923 Doucet, et al. Doucet discloses the distribution of television signals from one source to many receivers. The transmitter uses an X-Y beam deflector made of two galvanometer driven mirrors. This assembly is used to direct the beam into a specific receiver at a selected home.

U.S. Pat. No. 5,818,619 Medved, et al. Medved describes a communications network with air-links. A converter unit is converting the physical data transmission in the network to electricity, and drives an air-link transmitter. Similarly, the received beam is converted to electricity after reception. Medved also describes an optical switch to have one air-link serving plurality of networks between the same two locations.

EP 962796A2 Application Laor, et al. This application describes MEMS mirror construction.

SUMMARY OF THE INVENTION

An optical interconnect with light beams between buildings suffers from a difficulty associated with the movement of the buildings. The movements include waving in the wind, environmental vibrations, land shift, earthquakes, etc. Common over-the-air optical transmission equipment either uses narrow beam laser transmitters with tracking mechanisms or LED based wide beam transmitters with fixed aiming.

MEMS is a technology that is used to manufacture small mechanical systems using common Silicon foundry processes. We describe here the use of narrow field of view transmission with a MEMS mirror being used to fine tune the beam direction. Since the MEMS mirror is rather small, 1–3 millimeters in diameter, it is difficult, if not impossible to use it to aim the expanded beam. In an embodiment of the invention, the MEMS mirror is installed near the light source, where the beam is small in diameter. This positioning enables only small angular deflection of the beam. The transmission equipment will be coarsely aimed either manually or with motors, and the MEMS mirror will do fine aiming with fast response. With coarse motorized aiming, the motors may be operated to search and find the other side of the communication link. After the MEMS mirror has begun aiming the beam, the motors could be adjusted slowly to hold the aim such that the MEMS mirror average angular deviation is around zero. This will maximize the correction capability of the MEMS mirror.

We will use the term "light" to mean all electromagnetic waves from the ultraviolate to infrared, and not only for the visible spectrum. This is a common use of the term. The common transmission wavelength is with light in the near infrared, and not only for the visible spectrum. This is a common use of the term. The common transmission wavelength is with light in the near infrared between 600 and 1600 nano-meters.

Another feature of the present invention is the use of optical fiber to carry light from a light source in data equipment to the optical beam transmitter positioned on the roof or in a window. Another optical fiber carries the light from an optical beam receiver on the roof or in a window to a detector in the data equipment. This facilitates the changing of data equipment, changing data rates, changing protocols, etc., without the need to replace the optical beam transmitter or beam receiver. The system may be upgraded to carry light in more then one wavelength using the same optical beam transmitter and receiver. For long transmission lengths, an optical fiber amplifier could be installed between the light source and the optical beam transmitter, or between the optical beam receiver and the detector, or both locations. For systems located in areas with common fog problems, such amplifiers could be set to activate when the transmission is fading.

Yet another feature is the use of two fast optical fiber 1×N switches to time-share the use of a network between several users. One network port will connect to the switches, with two fibers—transmit and receive. On the other side of the switches each pair of fibers will be connected to a pair of an optical transmitter and an optical receiver, aimed at one network user. This allows serving high data rate network interconnect to customers in a time-shared fashion, and adjusting the percentage of time used according to the needs of each customer. When the need arises, a dedicated network port could be used to direct-connect a customer for a full connection. This structure of the system having fully transparent optical transmitters and receivers allows for seamless transfer using dedicated fibers between the two locations when such fibers are installed.

A construction is described where the beam transmitter and the beam receiver share the use of one MEMS mirror. Servo control of the MEMS mirror angular position may be achieved with a separate servo LED source and a servo optical position detector. Close loop servo control is critical to the correct operation of the transmission system.

DESCRIPTION OF THE PREFERRED EMBODIMENTS

The invention comprises a method and apparatus for a MEMS based over-the-air optical data transmission system. In the following description, numerous specific details are set forth to provide a more thorough description of embodiments of the invention, It will be apparent, however, to one skilled in the art, that the invention may be practiced without these specific details. In other instances, well known features have not been described in detail so as not to obscure the invention.

Figure 1:
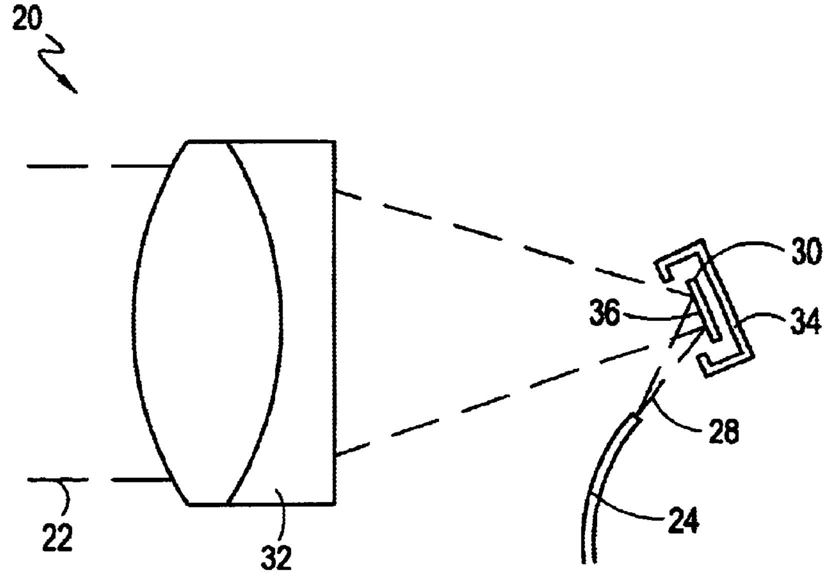
FIG. 1 is a schematic view of a beam transceiver in accordance with the present invention.

FIG. 1 shows the construction of a beam transceiver 20 in accordance with one embodiment of the invention. The beam transceiver 20 may operate as a beam transmitter or as a beam receiver, or as both. In the beam transceiver 20 shown in FIG. 1, a light beam 22 that propagates in the optical fiber 24 exists in the fiber end 28 in a cone 28. The optical fiber 24 is a common single-mode telecommunications fiber, with a core diameter of approximately 10 microns and a cladding diameter of 125 microns. The cone 28 of light hits a MEMS mirror 30 and is deflected toward a lens 32, which collimates the beam 22 for transmission. The collimation may not be exact, as larger or smaller beam angles may be required. As shown in FIG. 1, the mirror 30 is enclosed in a mirror package 34. The mirror 30 may be rotated in two degrees of freedom over two perpendicular axes (not shown) which are parallel to a mirror surface 36. An image 38*a* or 38*b* (FIG. 2) of the optical fiber end 26 is thus moved in space. By moving the image 38a or 38b of the optical fiber 24, the beam 22 that emerges from the lens 32 changes direction.

Figure 2:
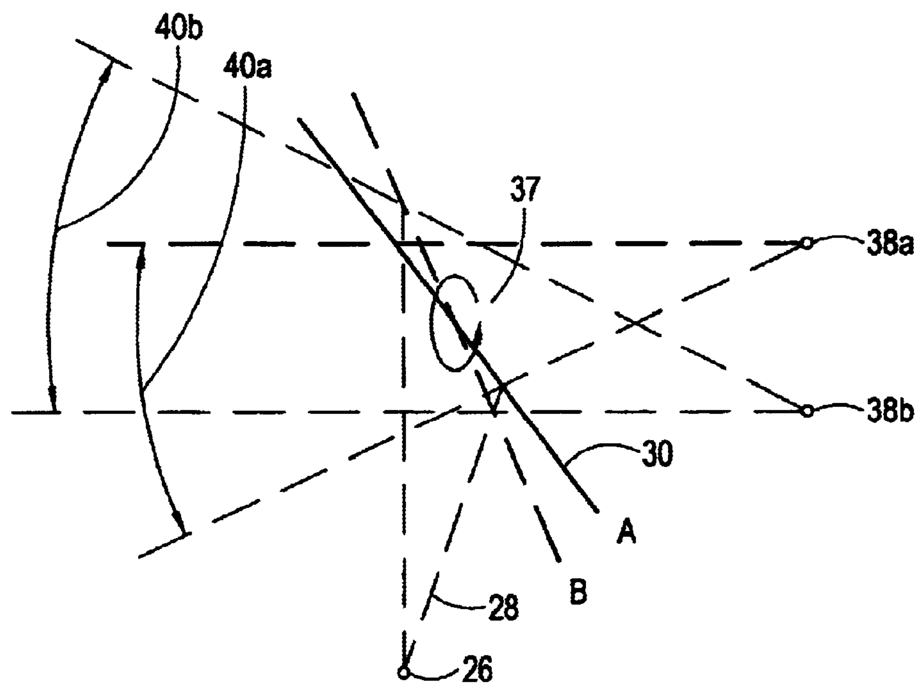
FIG. 2 is a schematic view showing the movement of an image at an optical fiber end shown in FIG. 1.

FIG. 2 is a schematic drawing showing the movement of the image 38*a* or 38*b* to the optical fiber end 26 in accordance with the present invention. A light cone 28 emerges from the fiber core at the fiber end 26. The cone 28 is reflected by the MEMS mirror 30. The mirror 30 is rotatable around the axis 37 shown, and the second axis is not shown for clarity. When the mirror 30 is in position A, the mirror 30 creates an image 38*a* and the light beam 22 exits in a cone 40*a*. When the mirror 30 is in position B, the mirror 30 creates an image 38*b* and the light beam 22 exits in cone 40*b*. Since image 38*a* and image 38*b* are in different positions, the lens 32 will collimate light beam 22 exiting from these images 38*a* or 38*b* in different directions. Two exiting cones 40*a* and 40*b* have some beam wander on the lens 32, requiring somewhat larger lens diameter.

Figure 3:
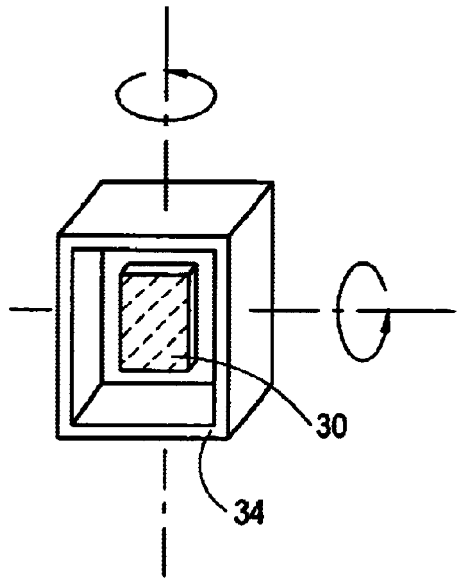
FIG. 3 is a perspective view of a MEMS mirror positioned in the mirror package shown in FIG. 1.

In FIG. 3, the MEMS mirror 30 is drawn showing only the mirror 30 and the mirror package 34. The mirror package 34 is a mechanical structure that holds and protects the MEMS mirror 30. The mirror package 34 may have a window that enables hermetic sealing, not shown here for clarity. The MEMS mirror 30 can be controlled to rotate in the horizontal and vertical axis. A detailed description of a type of MEMS mirror useful for this application may be found in "Optical Switch Demos in Cross-Connect" by David Krozier and Alan Richards, Electronic Engineering Times, May 13, 1999, p. 80 and in EP 962796A2. The MEMS mirror dimensions are reported to be approximately 3 mm×4 mm. The size is larger than a typical MEMS mirror and is quite useful for the construction of the beam transceiver 20. A smaller MEMS mirror 30 will require the optical fiber 24 (FIG. 1) to be very near to the mirror 30, which may be obstructing part of the beam 22 (FIG. 1). Also, a small mirror 30 will create only a small deviation of the position of the image 38*a* or 38*b* on the optical fiber 24, and will achieve a small active angle of aiming. However, the size of the MEMS mirror 30 may vary in accordance with different embodiments of the present invention.

Figure 4:
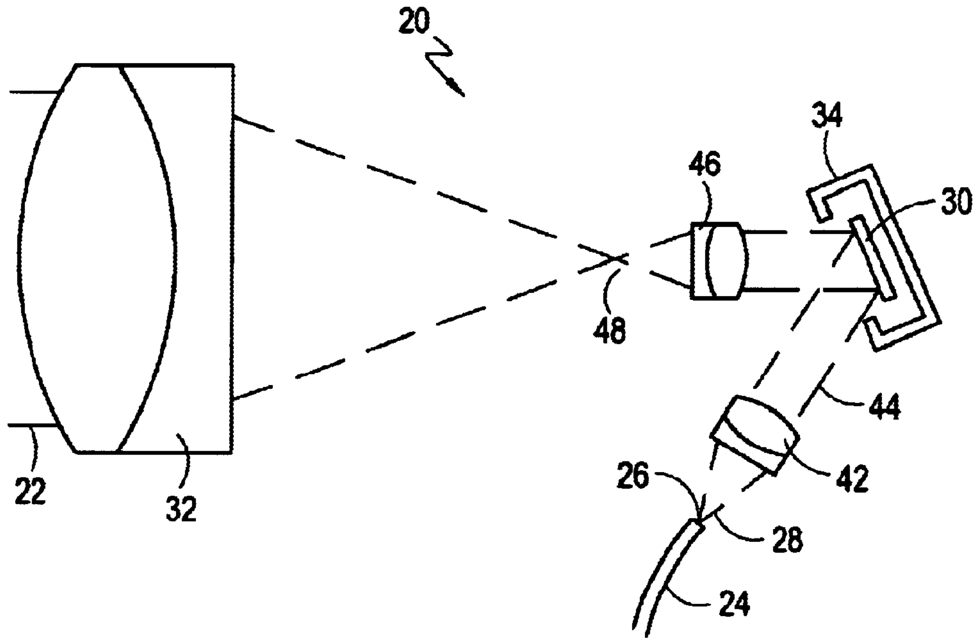
FIG. 4 is a schematic view of a beam transmitter in accordance with the present invention.

FIG. 4 shows a different optical design of a beam transceiver 20 in accordance with the present invention. The light beam 22 emerging from the optical fiber 24 in a cone 28 is collimated by an "on-axis" lens 42. The collimated beam 44 is reflected by the MEMS mirror 30 into an "eyepiece" lens 46. The eyepiece lens 46 focuses the collimated beam 44 into a real image focal spot 48 at or near the focal plane of the lens 32. The lens 32 creates a collimated or nearly collimated light beam 22 for transmission. By rotating the MEMS mirror 30, the location of the real image focal spot 48 can be adjusted, thereby adjusting the direction of the transmitted light beam 22.

It is common knowledge that for any path taken by a beam of light, the reverse path is also a possible path for another beam. Therefore, FIGS. 1–4 which were used above to describe the beam transceiver 20 operating as a beam transmitter will also be used to explain operation of the beam transceiver 20 as a beam receiver. Referring to FIG. 1, a light beam 22 arrives at a lens 32 and being focused and directed to a fiber end 26 of an optical fiber 24 by a MEMS mirror 30. The direction from where the optical fiber 24 will accept a light beam 22 is controlled by the MEMS mirror 30. The optical fiber 24 in the beam transceiver 20 operating as a beam receiver may be identical to the optical fiber 24 in the beam transceiver 20 operating as a beam transmitter, but it may also be a common multi-mode fiber with a core diameter of 50 or 62.5 microns and a clad diameter of 125 microns. A larger core diameter will allow relaxed aiming accuracy, but will limit the data rate if the fiber is long, due to modal dispersion.

A pair of beam transceivers 20, one operating as a beam transmitter and one operating as a beam receiver, together create a one-way optical link. The distance between the beam transceivers 20 could be several kilometers. For two-way communications, light beams 22 can be made to propagate in the optical fibers 24 in both directions simultaneously. Alternatively, two beam transceivers 20, each operating as both a beam transmitter and a beam receiver, can be used to create a full duplex optical link.

Figure 5:
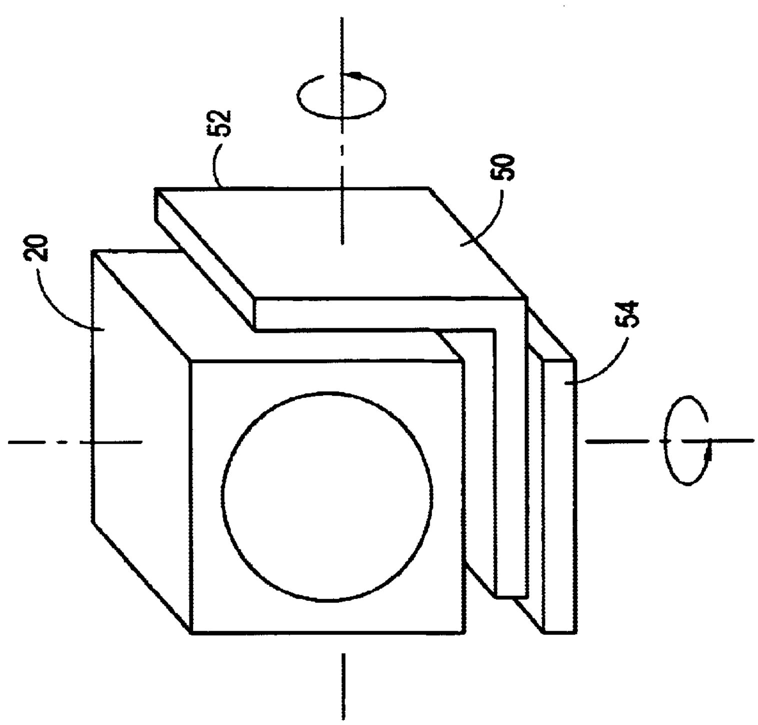
FIG. 5 is a perspective view of a beam transceiver with a coarse aiming mechanism in accordance with the present invention.

The beam steering by the MEMS mirror 30 is limited in angular deviation. Only a few degrees of angular deviation are typically possible. In some designs, only a fraction of a degree of adjustment is possible. Therefore, a mechanism for coarse aiming is required, which is capable of aiming in 360 degrees in azimuth and approximately +/−45 degrees in elevation. FIG. 5 shows the beam transceiver 20 mounted in a coarse aiming mechanism 50. The beam transceiver 20 is mounted onto a mount 52, with a motor that controls the horizontal axis of rotation of the beam transceiver 20. The motor enables the movement of the beam 22 (FIG. 4) in elevation. The exact design of the motor and a drive mechanism 50 are not shown. The mount 52 is attached to a base 54 with a similar drive mechanism, which enables rotation around the vertical axis, for adjusting the beam 22 in an azimuth direction. The motors are capable of aiming the beam 22 generally to a target, but are neither fast nor accurate enough to track building movements.

Figure 6:
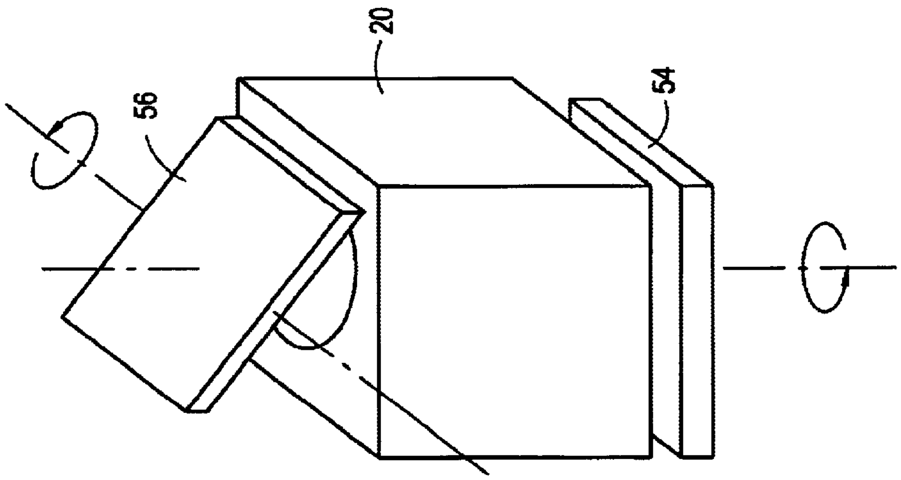
FIG. 6 is a perspective view of a beam transceiver with a coarse aiming mechanism in accordance with the present invention.

FIG. 6 shows a different structure for adjusting the light beam 22 in an azimuth direction. The beam transceiver 20 is mounted on the base 54 facing up. A large folding mirror 56 directs the light beam 22 in a general horizontal direction. The beam transceiver 20 and the folding mirror 56 rotate around the vertical axis for azimuth control. It is possible that only the folding mirror 56 will rotate to achieve azimuth control. The folding mirror 56 aims the light beam 22 in elevation by rotating around a horizontal axis. Again, the motor drive is not shown.

Figure 7:
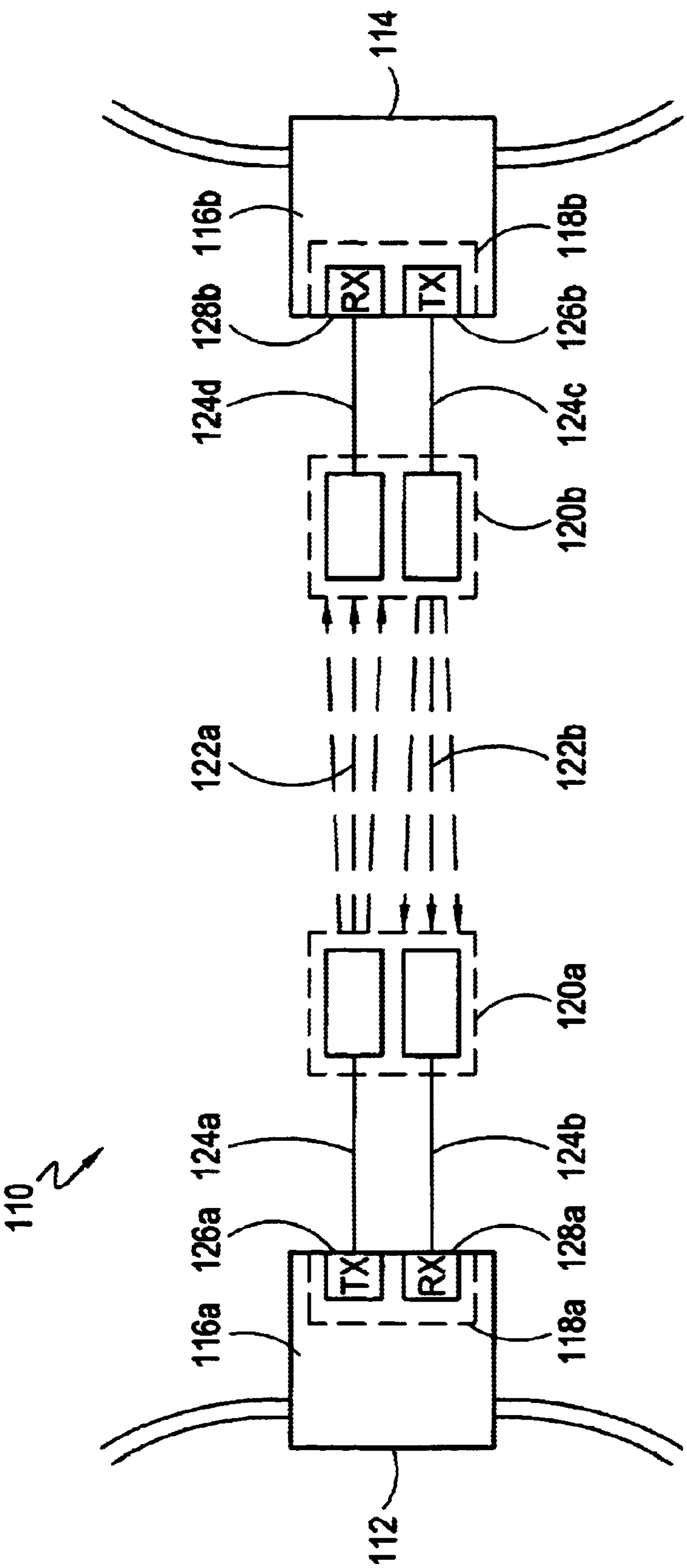
FIG. 7 is a schematic view of an optical link using beam transmitters in accordance with the present invention.

FIG. 7 shows a network system 110 using the beam transceivers 120a and 120b, which are described above as transceiver 20. A main network 112 needs to interconnect with a sub-network 114. The main network 112 and the sub-network 114 are located in different buildings with free line-of-sight between them. It is also possible to interconnect the main network 112 to the sub-network 114 between different floors of the same building by sending light beams 122a and 122b vertically. A network element 116a, such as a switch, router and the like, is attached to the main network 112. A port 118a in the network element 116a is connected to the beam transceiver 120a with a pair of optical fibers 124a and 124b. A laser or LED transmitter and a PIN or avalanche photodiode detector at the network element 116a or 116b performs the light generation and detection respectively, commonly marked TX and RX. The beam transceiver 120a is mounted on the roof or in a window, and aimed at the beam transceiver 120b, which is connected to the sub-network 114 with optical fibers 124c and 124d. When the beam transceivers 120a and 120b are correctly aimed at each other, light from the respective TX units 126a and 126b at each respective network element 116a and 116b is passed via the respective optical fibers 124a and 124c to the respective beam transmitters 120a and 120b, over the air to the respective beam transceivers 120b and 120a and to the respective RX units 128b and 128a at the other respective network elements 116b and 116a. Accordingly, a full duplex communication is established.

Since the network elements 116a and 116b see standard fiber attachments, it is very simple to correct direct point-to-point optical fibers 124 between the network elements 116a and 116b when available, replacing the over-the-air link. This feature allows for seamless growth of the network system 110.

Figure 8:
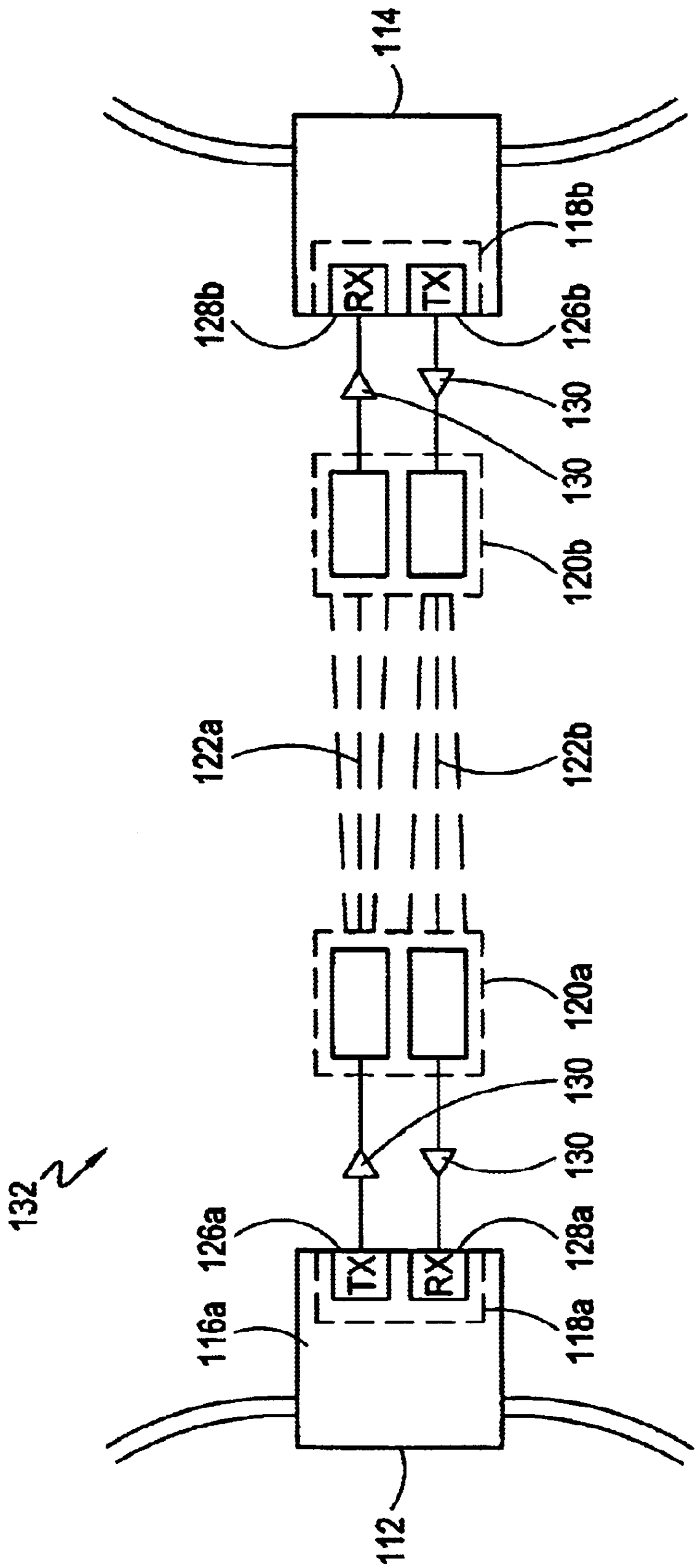
FIG. 8 is a schematic view of an optical link showing fiber amplifiers inserted into beam transmitters in accordance with the present invention.

Optical transmissions from the respective TX units 126a and 126b to the respective RX units 128b and 128a will suffer losses, due to loss in the optical fibers 124a–d, optical abberrations and diffraction in the beam transceivers 120a and 120b, a receiver aperture being smaller in diameter than the beam 122a or 122b generated by the respective beam transceivers 120a and 120b, inaccuracies in the aiming mechanism for both transmitter and receiver, and optical absorption and scattering in the atmosphere, etc. In common 2.5 Gbps transmission equipment, such loss is allowed to reach 20–30 dB, i.e. only {fraction (1/100)} to {fraction (1/1000)} of the light transmitted by the laser should arrive at the detector to achieve low error rate transmission. If the link loss is excessive, optical fiber amplifiers 130 may be inserted in the link 132 as shown in FIG. 8. The optical fiber amplifiers 130 that are commonly used are Erbium Doped Fiber Amplifiers (EDFA). Optical fiber amplifiers 130 may be inserted into the link 132 after the lasers in the TX units 126a and 126b boost the transmitter power, dr before the receivers in the RX units 128a and 128b increase the received optical power, or in both locations. If a high loss is a phenomenon related only to fog conditions, the amplifiers 130 may be inserted actively when the bit error rate deteriorates.

Figure 9:
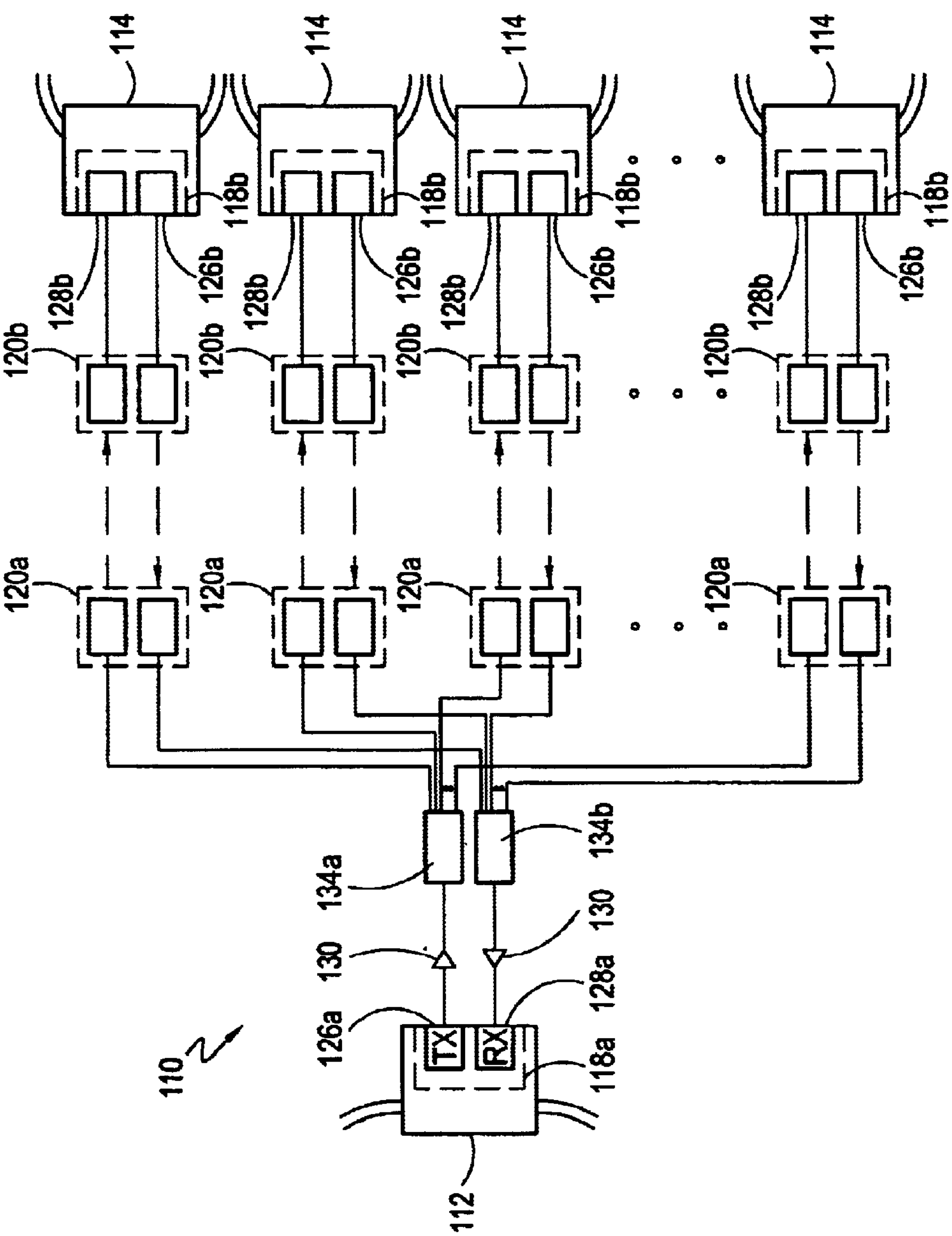
FIG. 9 is a schematic view of a main network serving multiple sub-networks in accordance with the present invention.

FIG. 9 shows a network system 110 where several sub-networks 114 are served by one main network 112. A 1×N fiber optic switch 134a is attached to the TX unit 126a of the port 118a in the main network 112. The switch 134a is serving light to one of the beam transceivers 120a at a time. A second switch 134b is connected to the RX unit 128a of the port 118a. Each sub-network 114 operates for a short time, and then is disconnected for a longer time. For example, the switching time may be 5 mS and each sub-network 114 could be served for 100 mS at a time. If there are 5 sub-networks 114, there will be a gap of 425 mS between connections for any specific sub-network 114. Some messages may be delayed, but this may be tolerated. If the link loss is different to different sub-networks 114, the gain of the corresponding optical amplifier 130 may be adjusted to each sub-network 114 differently. Fast AGC is required on all the RX units 128a and 128b. This construction enables the installation of standard transmission equipment, for example Gigabit Ethernet, in all the network elements 116a and 116b, even when the communications need is lower, and adjusting the main network 112 connect time to each sub-network 114 according to the needs. An advantage is the use of only two optical fiber amplifiers 130, which are expensive. Another advantage is that the connectivity to each sub-network 114 may be adjusted without the need for a physical equipment change, and remotely. The user of the sub-network 114 may be charged for network services according to the average data rate he uses. Only when a particular sub-network 114 needs full connectivity at the main network data rate, the particular sub-network may be assigned a particular port 118*a* in the main network and directly connected to the particular port 118*a* instead of via the fiber switches 134*a* and 134*b*.

Figure 10:
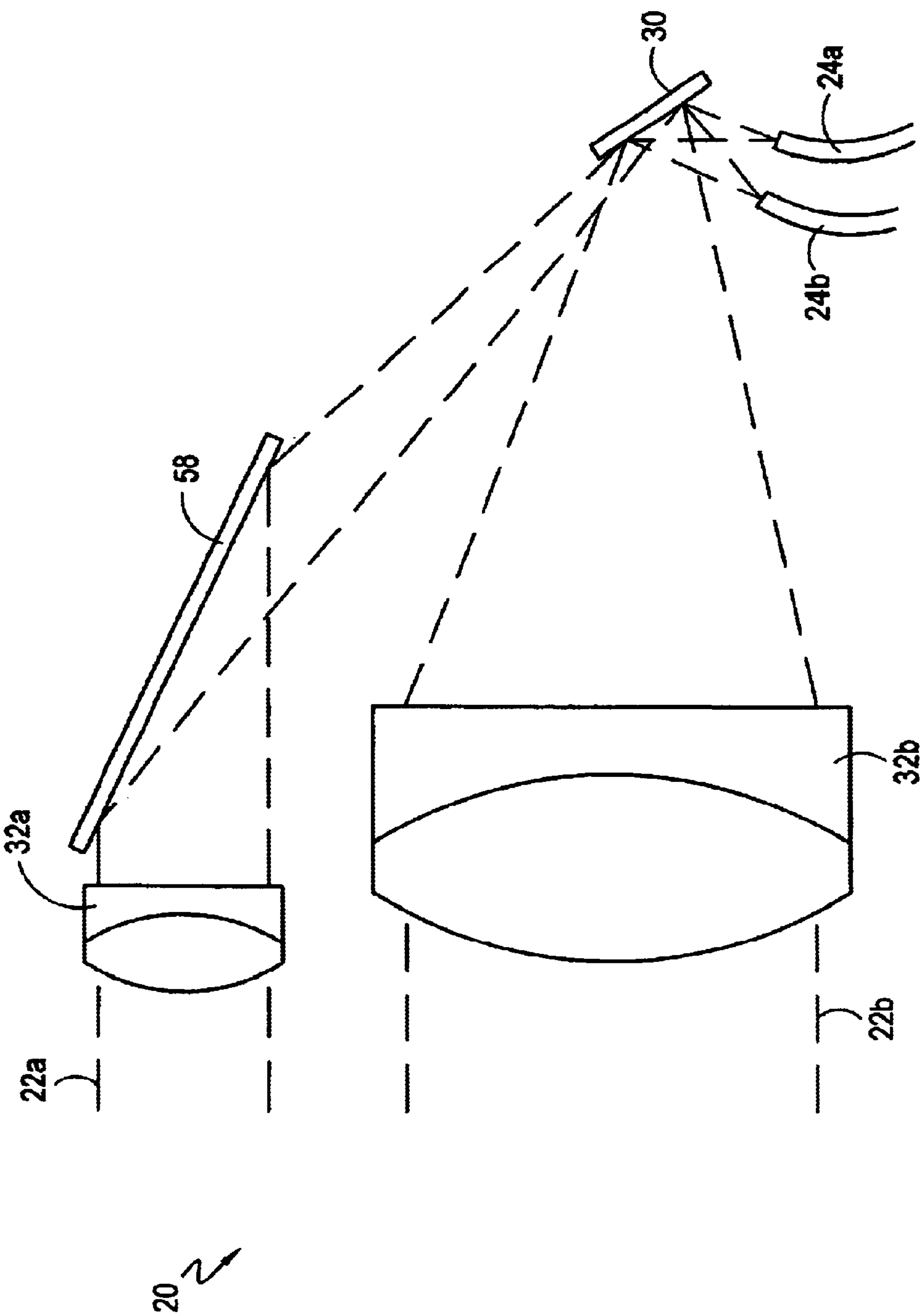
FIG. 10 is a schematic view of a beam transceiver when a MEMS mirror controls both a transmitted beam and a received beam in accordance with the present invention.

FIG. 10 shows another embodiment of the beam transceiver 20 using the MEMS mirror 30 to control both a transmitted beam 22*a* and a received beam 22*b*. The transmit optical fiber 24*a* shown has a Numerical Aperture (NA) of 0.1, which is common for Single Mode fibers, and creates an opening of the beam at about 5.7 degrees from the axis. The transmitted beam 22*a* reflects from the MEMS mirror 30 and is aimed at a transmit lens 32*a* via a fixed mirror 58. The receive optical fiber 24*b* shown has an NA of 0.26, which is common for multi-mode fibers with a core diameter of 62.5 microns. The receive lens 32*b* focuses the received beam 22*b* on the MEMS mirror 30. The received beam 22*b* will have a radius of about 15 degrees. Since it is intended to use the same area of the MEMS mirror 30 for both transmission and reception, the transmit and receive cones 28*a* and 28*b* can not have parallel axes at the MEMS mirror 30. The fixed mirror 58 is used, therefore, to make the transmit and receive beams 22*a* and 22*b* parallel outside of beam transceiver 20.

Figure 11:
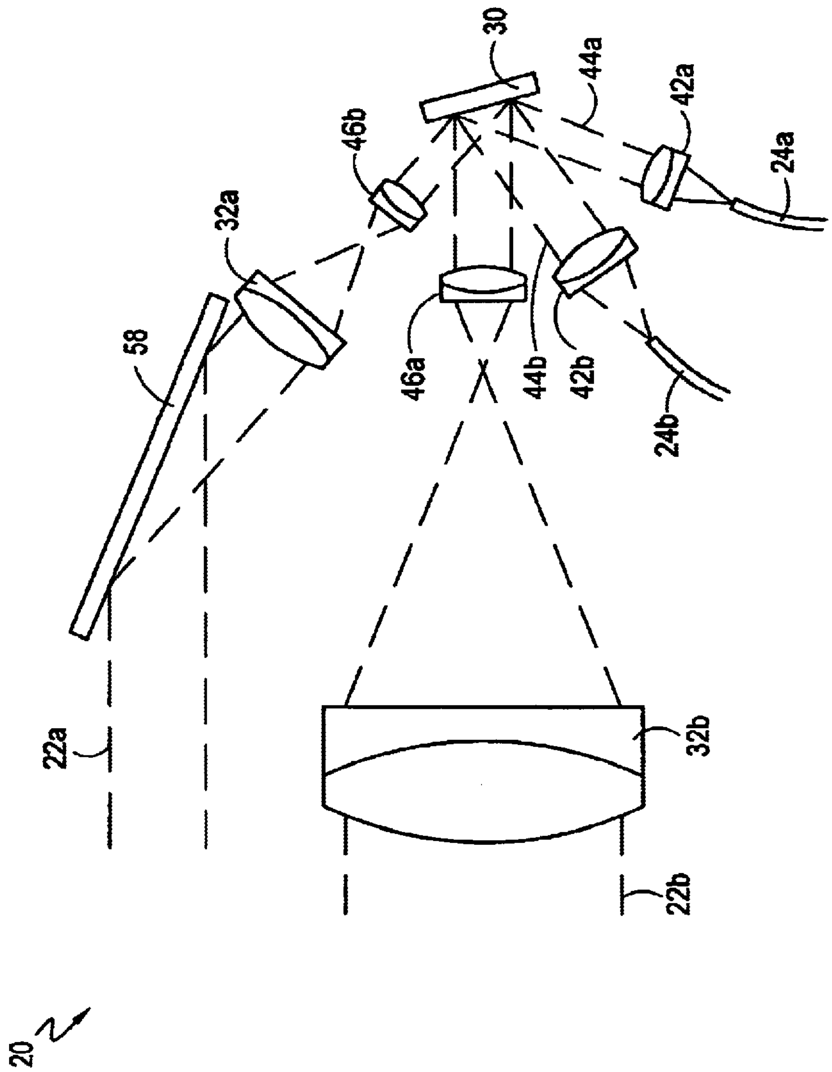
FIG. 11 is a schematic view of a beam transceiver when a MEMS mirror controls both a transmitted beam and a received beam in accordance with the present invention.

FIG. 11 shows the design of a MEMS mirror 30 serving both transmission and reception, where the collimated beams 44*a* and 44*b* at the MEMS mirror 30 are substantially collimated. The description of each optical path, for transmission and reception, is essentially the same as described above for FIG. 4 and FIG. 10. However, the position of the fixed mirror 58 and the transmit lens 32*a* are swapped. Eyepiece lens 46*a* and on-axis lens 42*a* control the transmit beam 22*a*, and eyepiece lens 46*b* and on-axis lens 42*b* control the receive beam 22*b*.

Figure 12:
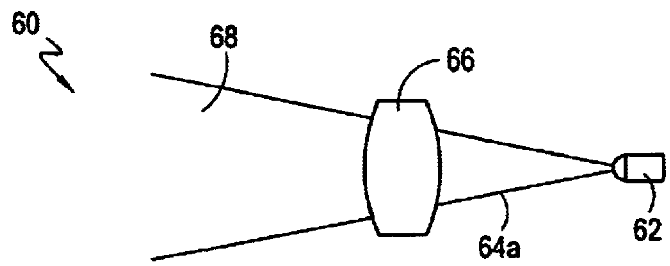
FIG. 12 is a schematic view of a servo LED being used as a light source in accordance with the present invention.
Figure 13:
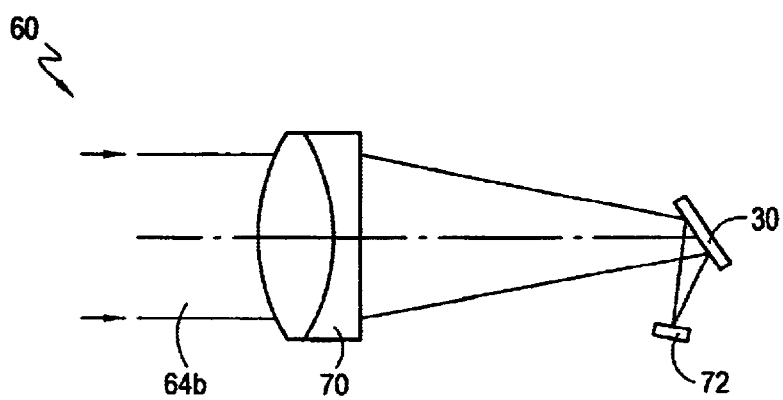
FIG. 13 is a schematic view of a position sensor in accordance with the present invention.

The operation of the atmospheric optical link depends critically on the correct aim of the transmit and receive beams 22*a* and 22*b*. A servo control system 59 (see FIG. 15) must be employed to aim the beams 22*a* and 22*b*. The servo control system 59 should have a different mechanism to align the beams 22*a* and 22*b* and many different ways are known an described in the prior art. We need, however, a mechanism that makes use of the positioning of the same MEMS mirror 30 as the transmit and receive beams 22*a* and 22*b*. The essential parts of such a servo system 60 are shown in FIGS. 12 and 13. In FIG. 12, a servo LED 62 is used as the light source. A laser could also be used as the light source. The servo LED 62 emits light in a servo light beam 64*a* modulated at relatively low speed, enabling detection with low received power. A servo LED lens 66 creates a wide cone of light 68 from the servo light beam 64*a* emitted by the servo LED 62. This cone 68 may be several degrees wide, so the aiming is very simple and the amount of detected radiation is not sensitive to small movements of this beam. FIG. 13 shops a servo sensor of the servo system 60, which uses the same MEMS mirror 30 as described before. The servo light beam 64*b* is focused on the MEMS mirror 30 with a servo sensor lens 70. The servo sensor of the servo system 60 uses an optical position detector 72, which is a common art and includes a Silicone diode with several outputs. The electrical signals outputted from the detector 72 are sensitive to the intensity of an optical signal in a received servo light beam 64*b* and to the exact location of the optical signal on the detector 72. The electrical signals indicate if the MEMS mirror is aiming the servo light team 64*a* directly at an opposing servo LED 62. If there is an error in aiming, the electrical signal outputted from the detector 72 indicates the direction and magnitude of the error. The servo system 60 will then adjust the MEMS mirror 30 correctly.

Figure 14:
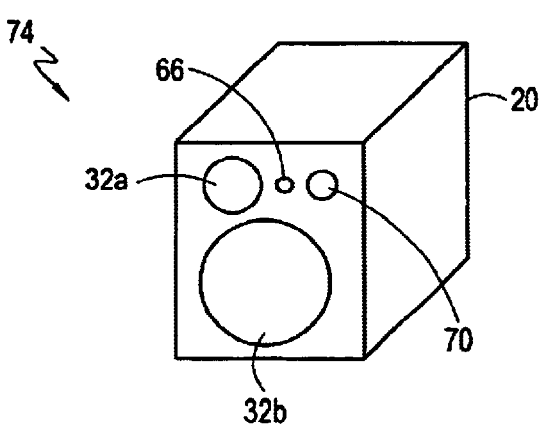
FIG. 14 is a perspective view of a beam transceiver in accordance with the present invention.
Figure 15:
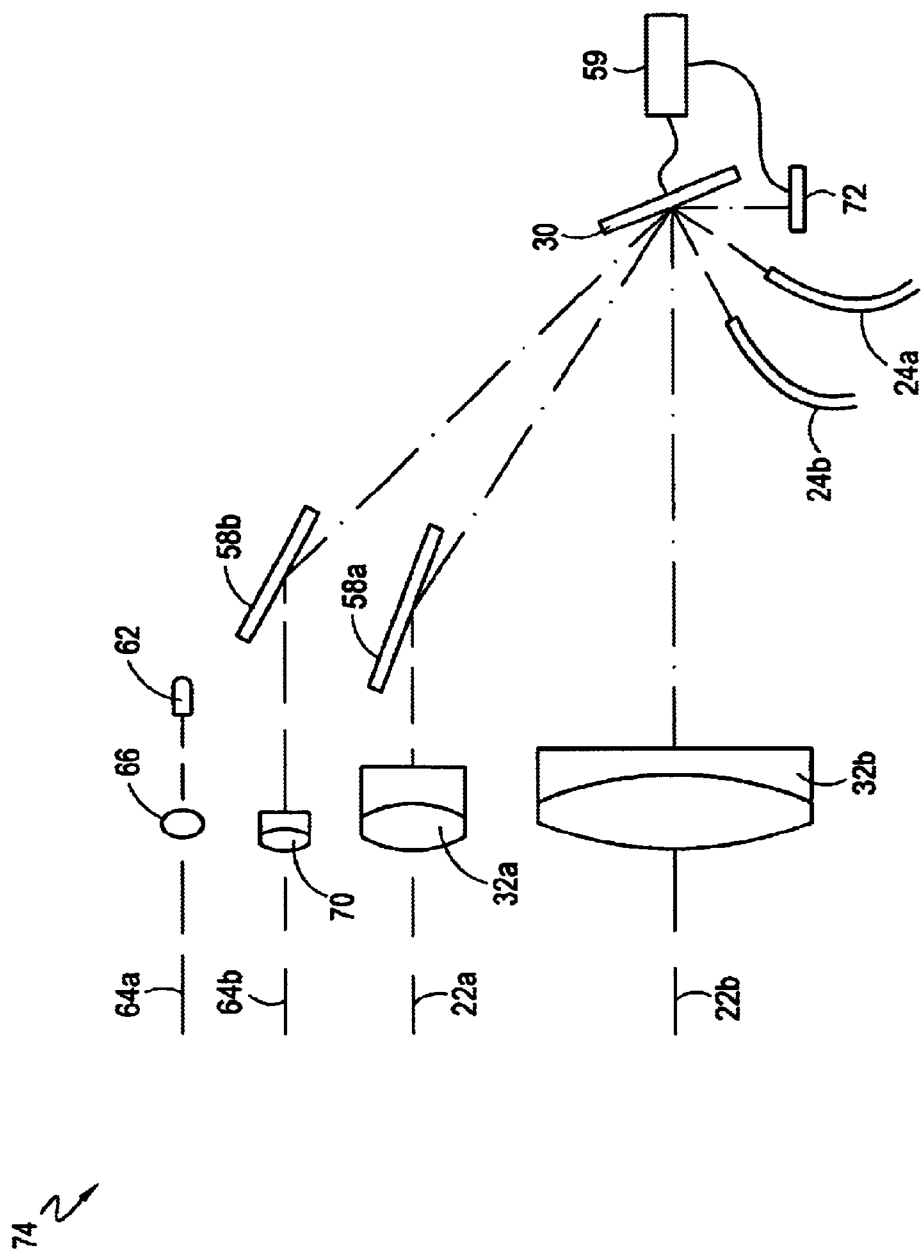
FIG. 15 is an elevational view of the beam transceiver shown in FIG. 14.

FIG. 14 shows the outside view of an optical system 74 incorporating the beam transceiver 20. In FIG. 15, a flattened drawing of the optical system 74 of FIG. 14 is shown. The optical beams are shown by the central beam only, for clarity. As shown in FIG. 15, one MEMS mirror 30 is used to control three beams 22*a*, 22*b* and 64*b* concurrently. Accordingly, fixed mirror 58*a* reflects the transmit light beam 22*a* onto the MEMS mirror 30, and fixed mirror 58*b* reflects the servo light beam 64*b* onto the MEMS mirror 30.

Thus, a method and apparatus for MEMS based over-the-air optical data transmission system has been described. However, the claims and the full scope of their equivalents describe the invention.

What is claimed is:

1. A system for directing a communications light beam from free-space, said system comprising:

a source for generating a reference light beam wherein the reference light beam has a predetermined spatial relationship with the communications light beam;

an optical fiber having an end;

an optical position detector having a target;

an adjustable Micro-Electro-Mechanical-Systems (MEMS) mirror;

a first lens for directing the communications light beam to said MEMS mirror and subsequently toward said end of said optical fiber;

a second lens;

a mirror, said mirror acting in concert with said second lens to direct the reference light beam to said MEMS mirror and subsequently to an incident point on said optical position detector, said optical position detector configured to generate an error signal indicative of a spatial relationship of the incident point on said optical position detector to the target of said optical position detector; and a closed loop servo control system for moving said MEMS mirror in response to said error signal to nullify said error signal to direct the communications light beam to a predetermined point on said end of said optical fiber.

2. A system as recited in claim 1, wherein the communications light beam is substantially parallel to the reference light beam.

3. A system as recited in claim 1, wherein said MEMS mirror is a reflective surface having a diameter in the range of 1 millimeter to 3 millimeters.

4. A system as recited in claim 1, wherein said mirror is positioned between said second lens and said MEMS mirror.

5. A system as recited in claim 4, wherein said communications light beam is a first communications light beam, said system further comprising a means for directing a second communications light beam from said end of said optical fiber through said system into free space.

6. A system as recited in claim 4, wherein said optical fiber is a first optical fiber and the communications light beam is a first communications light beam, said system further comprising:

a third lens;

a second optical fiber having an end; and a means for directing a second communications light beam from said end of said second optical fiber to said MEMS mirror and subsequently to said third lens.

7. A system as recited in claim 6, further comprising:

a first network coupled to said first optical fiber for receiving the first communications light beam; and a second network coupled to said second optical fiber for transmitting the second communications light beam.

8. A system as recited in claim 6, further comprising:

a first amplifier coupled to said first optical fiber for amplifying the first communications light beam; and a second amplifier coupled to said second optical fiber for amplifying the second communications light beam.

9. A system as recited in claim 4, further comprising:

a third lens positioned between said first lens and said MEMS mirror for collimating the communications light beam; and a fourth lens located between said MEMS mirror and the optical fiber for focusing the communications light beam.

10. A system as recited in claim 5, wherein the reference light beam is a first reference light beam, said system further comprising:

a means for generating a second reference light beam substantially parallel to the second communications light beam.

11. A system as recited in claim 10, wherein said generating means comprises:

an LED for producing the second reference light beam; and a third lens for directing the second reference light beam into free-space.

* * * * *

UNITED STATES PATENT AND TRADEMARK OFFICE

CERTIFICATE OF CORRECTION

PATENT NO. : 6,944,403 B2
DATED : September 13, 2005
INVENTOR(S) : Margalit et al.

It is certified that error appears in the above-identified patent and that said Letters Patent is hereby corrected as shown below:

Column 1,
Line 22, delete "said" insert -- aid --.
Line 23, delete "Detour" insert -- Defour --.

Column 3,
Line 61, delete "invention," insert -- invention. --.

Column 4,
Line 4, delete "end 28" insert -- end 26 --.

Signed and Sealed this

Fifteenth Day of November, 2005

JON W. DUDAS
*Director of the United States Patent and Trademark Office*